United States Patent [19]

Alsdorf et al.

[11] Patent Number: 4,670,056

[45] Date of Patent: Jun. 2, 1987

[54] MATERIAL FOR SEALING BOREHOLE WALLS

[76] Inventors: Hermann Alsdorf, Grossoderscheid 120, 5063 Overath-Marialinden; Armin Dittmar, Heideweg 5, 2847 Barnstorf, both of Fed. Rep. of Germany

[21] Appl. No.: 670,363

[22] Filed: Nov. 9, 1984

[30] Foreign Application Priority Data

Nov. 12, 1983 [DE] Fed. Rep. of Germany ....... 3341038

[51] Int. Cl.$^4$ ................................................ C04B 9/00
[52] U.S. Cl. .................................. 106/105; 106/106; 106/118; 166/292
[58] Field of Search ....................... 106/105, 106, 118; 166/292

[56] References Cited

U.S. PATENT DOCUMENTS 2,649,160  8/1953  Williams et al. .................... 106/106

FOREIGN PATENT DOCUMENTS 831971  2/1952  Fed. Rep. of Germany ...... 106/106
1114138  7/1958  Fed. Rep. of Germany ...... 106/105

Primary Examiner—Mark L. Bell
Assistant Examiner—Steven Capella
Attorney, Agent, or Firm—Michael N. Meller

[57] ABSTRACT

Ground milk-of-lime grit with a maximum grain size of 0.75 mm is mixed with calcium or magnesium chloride and water to form a pumpable mixture which sets into an acid soluble mass only after about 1.5 to 4 hours.

4 Claims, No Drawings

MATERIAL FOR SEALING BOREHOLE WALLS

BACKGROUND OF THE INVENTION

In drilling for petroleum or natural gas, the drilling debris, is flushed out of the borehole by means of drilling mud and is then separated from the fluid, which is recirculated. The hydraulic pressure of the drilling mud in the borehole should be somewhat greater than the reservoir pressure in order to keep the borehole open and to prevent ingress of water, oil or gas from the drilled formations. Furthermore, it is advantageous if the interaction between the drilling mud and the drilled formations is low.

Aqueous drilling muds are usually suspensions of clay in water, which may contain protective colloids and other chemicals as chemical conditioners. They offer the advantage of forming a thin but dense filter cake on drilling through porous rock. In more highly porous or fissured formations, however, this effect is no longer sufficient. Here, large amounts of drilling fluid may be lost by being forced under their own hydrostatic pressure into the interstices and fissures of the surrounding formation. To prevent these unwanted losses, "plugging agents" such as mica, cellophane chips, walnut shells and similar materials can be added to the drilling mud, with the aim of sealing the loss zone. The disadvantage of these sealing materials is, however, that they are not compression-resistant and, after they have performed their sealing task, can no longer be removed. Their removal is however essential to prevent permanent damage to the reservoir bed.

An ideal sealing material must be sufficiently fluid to penetrate into the interstices and fissures of the geological formation and, only after it has done so, must solidify to such an extent that in this state it can withstand the hydrostatic pressure of the drilling mud. Furthermore, the solidified sealing material should be easy to remove again from the interstices and fissures of the formation, if the sealed formation is a reservoir in a deposit worth extracting. The sealing material must also be suitable for precementing the borehole walls, i.e., it must effect sealing of the formation in the area of the reservoir bed before actual cementation of the string of casing. In this way, penetration of the cement into the reservoir bed and the possible resulting damage to the reservoir bed can be prevented. For actual cementation of borehole walls, "deep well cements" are used, which are made fluid and thus easy to pump by adding large amounts of mix water. The setting of such cements can be accelerated by adding calcium chloride. Usually, however, the setting of cement slurries is retarded by adding materials such as starch, cellulose or sugar waste products, and especially lignin sulphonate (cf. "Ullmanns Enzyklopädie der Technischen Chemie", 3rd Ed., Vol. 6 (1955), p. 577).

A product which sets like cement, but which is acid soluble is "Sorel's cement", a mixture of magnesium oxide, magnesium chloride and water. Trials have already been performed with Sorel's cement for cementation of borehole walls.

In these attempts, it was found that in some cases the borehole became blocked due to premature setting of the Sorel's cement. Elevated temperatures in the borehole or the heat of reaction of the setting Sorel's cement initiated and accelerated this process.

The requirement therefore arose to find a pumpable material which sets into an acid soluble solid mass both at room temperature and at elevated temperature, but only after a period of 1.5 to 4 hours.

SUMMARY OF THE INVENTION

A material for sealing borehole walls was found, which consists of ground milk-of-lime grit with a maximum grain size of 0.75 and a grain component <0.1 mm of between 55 and 65% by weight, combined with calcium or magnesium chloride and water. This material should preferably consist of an intimate mixture of ground milk-of-lime grit and a more or less concentrated aqueous calcium or magnesium chloride solution in a weight ratio of about 4 : 5.

DETAILED DESCRIPTION

On burning lumps of lime to form calcium oxide, because of the inhomogeneous grain mixture, parts of the burned material reach a higher temperature than is necessary for elimination of the carbon dioxide. As a result, primary, fine-particle calcium oxide sinters to form larger, less reactive agglomerates, known as clinker. This sintering process is promoted by the mixtures in the lime, such as silicon, aluminum and iron oxides.

In dry slaking of such burnt lime, it is jet-sprayed with just the amount of water necessary for its hydration. As a result, the larger and highly reactive component of the burnt lime decomposes to form powdered calcium hydroxide. For the smaller portion of the slaked lime, which consists of the less reactive clinker, the slaking time is too short for hydration. This clinker, together with small amounts of burnt lime, is sieved out from the calcium hydroxide as milk-of-lime grit, which with a grain size up to 20 mm, has the following average composition:

CaO: 34% by weight
$Ca(OH)_2$: 40% by weight
$CaCO_3$: 21% by weight
$SiO_2$: 3.4% by weight
$Al_2O_3$: 0.8% by weight
$Fe_2O_3$: 0.8% by weight After this milk-of-lime grit has been ground into ground stock, with a maximum grain size of 0.75 mm and in which the proportion of grain size below 0.1 mm is between 55 and 65% by weight, this milk-of-lime grit can be used as a constituent of the sealing material according to the invention. To manufacture the sealing material according to the invention, this milk-of-lime grit is most advantageously mixed in a weight ratio of about 4 : 5 with a more or less concentrated aqueous solution of calcium or magnesium chloride (e.g. 20–50%) to form a fluid mixture. Another possibility is to mix the ground milk-of-lime grit firstly with fine-particle calcium or magnesium chloride and then to convert this mixture into the fluid mixture by adding an appropriate amount of water.

In both cases, other waste materials with hydraulic properties, such as brown coal ash, can be added to the material according to the invention. These waste materials however must not substantially impair the acid solubility of the solid product formed from the material according to the invention. The amount to which such waste materials are incorporated in the material according to the invention should not exceed 10 to 30% by weight of the solid component in the material according to the invention.

For a period of about 1 to 3 hours after its preparation, the material according to the invention remains a fluid mixture with very good pumping characteristics, and having a maximum viscosity of 5,000 m Pa s. Only about 1.5 to 4 hours after its preparation does this mixture set into a solid mass. As long as the material according to the invention is pumpable, it can easily be pumped up to the formation to be sealed in the borehole, where it penetrates into the interstices and fissures of this formation and sets into a solid mass which fills the aforementioned interstices and fissures in a tightly packed manner and with sufficient mechanical strength to prevent the drilling mud from penetrating into these interstices and fissures. Compared to mixtures of burnt lime, calcium or magnesium chloride and water, which within a short time of their preparation set into a solid product, the material according to the invention has the advantage that it remains fluid after its preparation for a length of time completely sufficient for it to be pumped, and only then sets. The setting of the material according to the invention can be further controlled by adding substances which retard or accelerate the setting process.

The material according to the invention can be manufactured from waste or by-products of the Solvay process, which in this way can be put to commercially beneficial use.

The solid products formed by setting of the material according to the invention can be virtually completely dissolved by acids, such as hydrochloric acid, which do not form any sparingly soluble compounds with the components of the material according to the invention. In this way, the interstices and fissures of drilled formations sealed with the aid of the material according to the invention can be rendered passable again, if so desired.

When using the material according to the invention for pre-cementing the reservoir bed area of a borehole, the solid product which forms from the material according to the invention creates a base to which the subsequently introduced cement mixture bonds securely and firmly.

EXAMPLE 1

240 parts by weight of ground milk-of-lime grit with the following grain size distribution:
>0.5 mm: 3% by weight
0.2-0.5 mm: 25% by weight
0.1-0.2 mm: 17% by weight
<0.1 mm: 55% by weight
are mixed with 360 parts by weight of a 30% calcium chloride solution for 30 minutes until a fluid mixture is formed, the viscosity of which, measured on a viscosity balance at a temperature of 45° C., is 2,000 mPa s.

When subsequently stored in a sealed vessel at a temperature of 60° C., this mixture begins to grow stiffer after 70 min. and after 5 hours no longer has a pumpable consistency. If this already partially set mixture is heated to a temperature of 90° C. after a further 24 hours, it sets into a solid mass in the course of 3 more days.

The same mixture, after a storage period of 90 min. at a temperature of 60° C. followed by an increase in temperature to 90° C., sets into a solid mass in about 20 hours.

EXAMPLE 2

240 parts by weight of the milk-of-lime grit specified in Example 1 are mixed for 30 minutes with 360 parts by weight of a 40% calcium chloride solution until a fluid mixture forms, the viscosity of which, measured on a viscosity scale at a temperature of 45° C., is 2,000 mPa s.

When subsequently stored in a sealed container at a temperature of 60° C., this mixture begins to grow stiffer after 60 min., after another 150 min. assumes a no longer pumpable consistency and after an additional 5 hours sets into a solid mass.

At a temperature of 90° C., the same mixture becomes stiffer after 50 min., no longer has a pumpable consistency after a further 80 min. and after an additional 4 hours sets into a solid mass.

At a temperature of 90° C., these solid masses dissolve completely in 5% hydrochloric acid.

We claim:

1. A material for sealing borehole walls, comprising ground milk-of-lime grit with maximum grain size of 0.75 mm and a grain component <0.1 mm between 55 and 65% by weight; a chloride selected from the group consisting of calcium chloride and magnesium chloride; and water.

2. The material according to claim 1, comprising an intimate mixture of the ground milk-of-lime grit, and the chloride and water in the form of a concentrated aqueous calcium chloride or magnesium chloride solution in a weight ratio of about 4 : 5.

3. The material according to claim 2, wherein the chloride solution has a concentration of 30–40% by weight.

4. The material according to claim 1, further comprising waste materials with hydraulic properties in quantities of 10 to 30% by weight of the solid component, which do not substantially impair acid solubility of a solid reaction product formed from the material and the water.

* * * * *